July 13, 1965  K. L. KIRKPATRICK  3,194,320
BANKER

Filed Dec. 28, 1962  3 Sheets-Sheet 1

INVENTOR.
KENNETH L. KIRKPATRICK
BY
*John C. Thompson*
ATTORNEY

July 13, 1965     K. L. KIRKPATRICK     3,194,320

BANKER

Filed Dec. 28, 1962     3 Sheets-Sheet 2

*INVENTOR.*
KENNETH L. KIRKPATRICK
BY
*John L. Thompson*
ATTORNEY

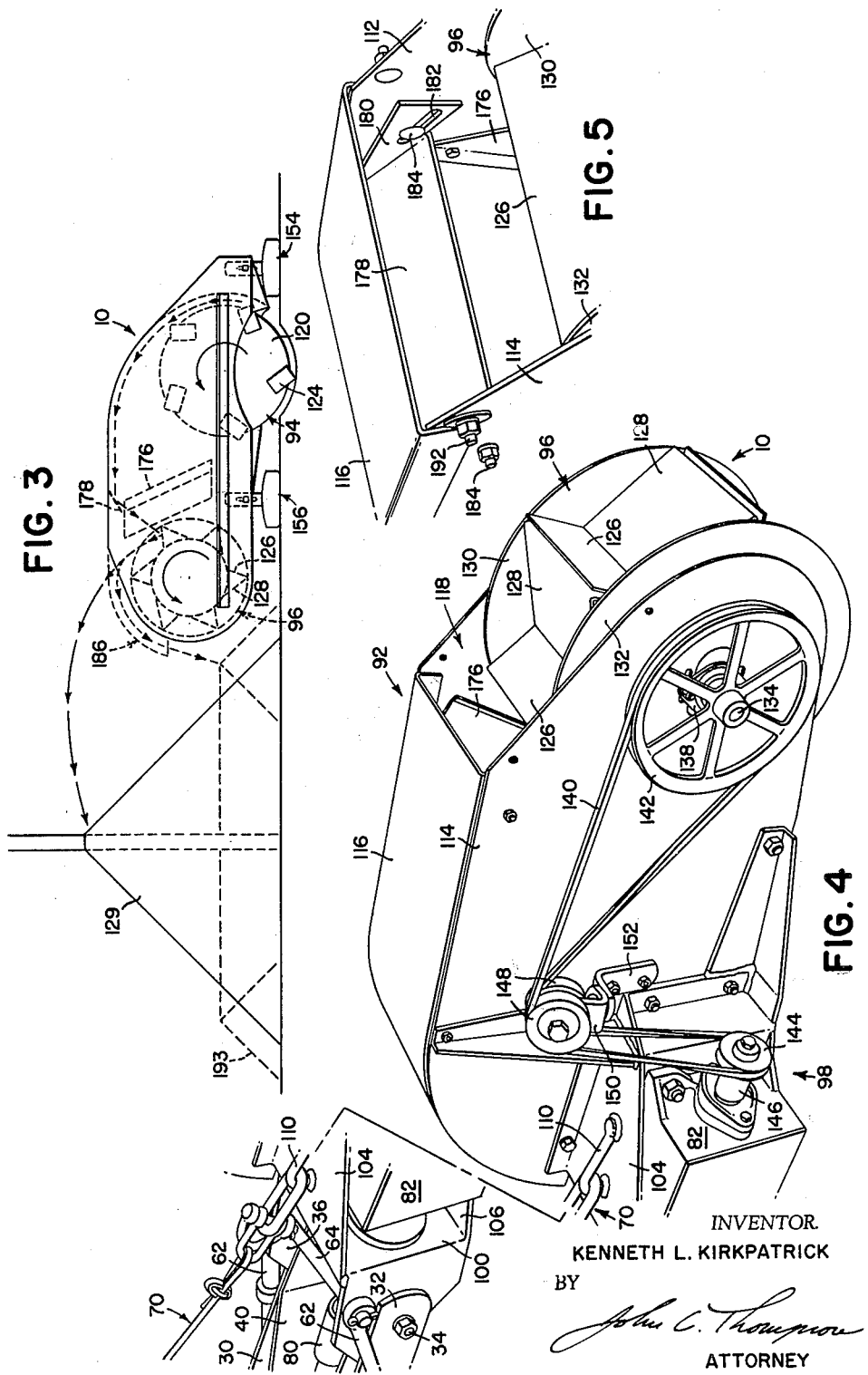

United States Patent Office 3,194,320
Patented July 13, 1965

3,194,320
BANKER
Kenneth L. Kirkpatrick, Welland, Ontario, Canada, assignor to Deere & Company, Moline, Ill., a corporation of Delaware
Filed Dec. 28, 1962, Ser. No. 248,059
7 Claims. (Cl. 172—33)

This invention relates generally to agricultural implements and more particularly to tractor carried and tractor driven earth working implements of the type particularly adapted for forming banks or irrigation rings about trees.

The object and general nature of this invention is the provision of a tractor carried power banker attachment having novel digging and delivery means. More particularly it is an object of the present invention to provide an implement having an earth digging and slinging wheel and a delivery wheel that receives earth from the digging and slinging wheel and projects the earth to the point of deposition. Another object of the present invention is the provision of a power banker having a housing in which earth digging and slinging means are provided and also in which earth delivery means are provided, and in which deflector means are provided within the housing between the earth digging and slinging means and the earth delivery means.

A further object of this invention is the provision of a separable member which, when attached to the power banker, can be employed for the production of irrigation rings.

Another object of the present invention is the provision of novel means for supporting the power banker particularly adapted to be employed in trashy conditions.

These and other objects and advantages of this invention will be apparent to those skilled in the art after consideration of the following detailed description, taken in conjunction with the accompanying drawings, in which:

FIG. 3 is a reduced front view of the power banker shown in FIG. 1 showing diagrammatically the flow of earth when forming either tree banks or irrigation rings about trees.

FIG. 4 is a rear perspective view of the power banker shown in FIG. 2, and

FIG. 5 is a rear perspective view on an enlarged scale illustrating the baffle means inside of the power banker housing.

Figure 1:
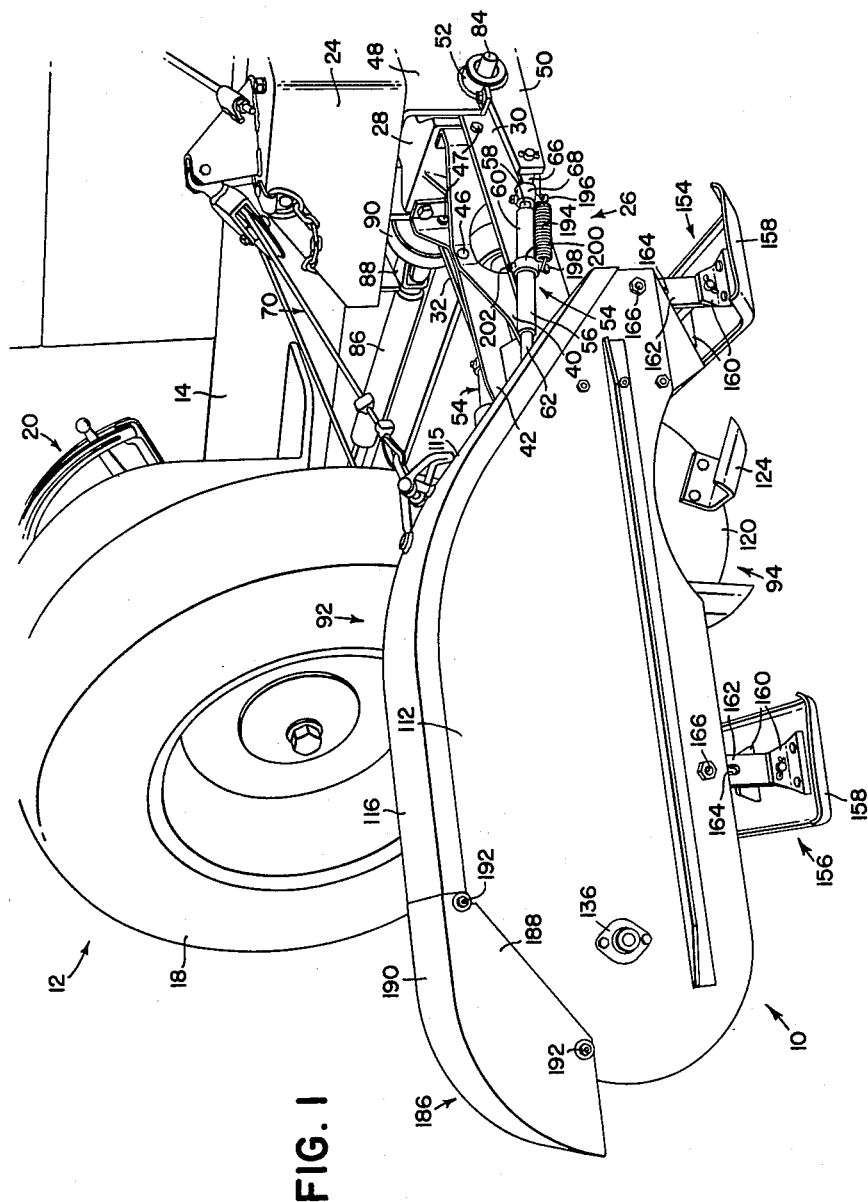
FIG. 1 is a fragmentary perspective view of the right side of a farm tractor and the associated portions of a laterally outwardly extending ground working unit in the form of a power banker, equipped with an irrigation hood.

Referring first to FIG. 1, the power banker attachment of this invention is shown as embodied in a generally laterally outwardly extending unit 10 connected to a farm tractor 12 that is of generally conventional construction and which includes frame means 14 mounted on front and rear wheels 16 and 18 respectively, the latter serving as traction or driving wheels. The tractor 12 is equipped with a power lift mechanism 20 that is generally conventional so far as the present invention is concerned. The banker unit 10 is normally operated in a horizontal ground engaging position, as best shown in FIGS. 1 and 3, but is permitted to float generally vertically relative to the tractor by means to be described below.

Figure 2:
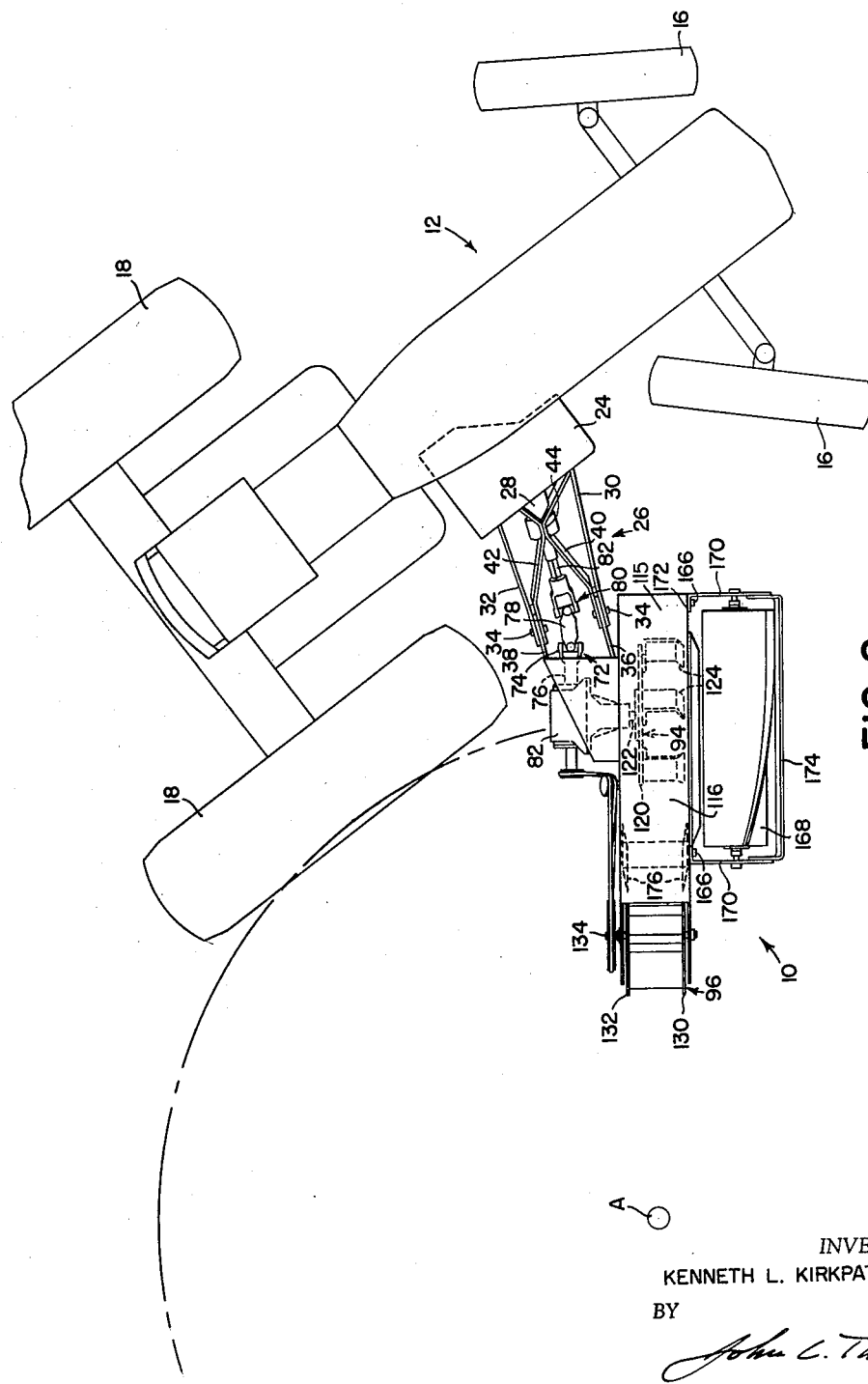
FIG. 2 is a plan view on a reduced scale of the tractor and power banker shown in FIG. 1, the power banker in this view being equipped with novel roller supporting means and modified front and rear side walls.

For the purpose of supporting the banker unit 10 and connecting the same with the tractor 12, the latter is provided with a supporting member 24 which is more fully described in applicant's Patent 3,092,053 and preferably takes the form of a generally boxlike mounting member that is fixed in any suitable way to the side of a tractor frame 14. An interconnecting or supporting frame, indicated generally at 26, is disposed about a bevel gear unit 28, and includes a pair of front and rear outer support frame members 30, 32, the laterally outer ends of which are apertured to receive a pair of pivot bolts 34 in axially aligned relation (FIG. 2) and pivotally or swingably connecting the support frame 26 with the hinge brackets 36, 38 of the power banker 10. The support frame 26 also includes a pair of front and rear inner members 40, 42. As best shown in FIGS. 1 and 2, these members are substantially identical and have central portions shaped to engage one another as indicated at 44, FIG. 2, and which are rigidly interconnected, as at 46, FIG. 1. The outer ends of members 40, 42 are apertured to receive the associated pivot bolts 34, and the opposite or inner ends of the parts 40, 42 are connected to the bevel gear housing 28 as shown in FIG. 1 and are also bolted, as at 47, to the adjacent portions of the front and rear support frame bars 30, 32. The laterally inner ends of the front and rear support frame members 30, 32 are connected to the bevel gear unit 28, and the bevel gear unit is in turn carried by a U-shaped bracket 48 which is adjustably secured to the supporting member 24. Control rod anchoring arms 50 are secured to bearing caps 52 carried by the depending legs of the U-shaped bracket 48. A pair of control rods in the form of lost motion link units 54 are connected between the laterally outer ends of the control rod anchoring arms 50 and the upper portions of the hinge plates or brackets 36, 38 above the axis, as defined by the pivots 34, of their connection with the supporting frame 26. Each lost motion unit comprises a pair of laterally outer and inner control rod members, 56 and 58, respectively, and each control rod member 56 includes a tubular section 60 and a short rod section 62 that is pivotally connected, as by a cross rod 64, with the hinge plates 36, 38 of the banker unit 10. The tubular sections 60 slidably receive the corresponding portions of the other control rod members 58, the latter having turned ends, as indicated at 66, pivotally disposed in associated apertures formed in the outermost ends of the arms 50. An abutment 68 is on each control rod 58, but in normal operating position, FIG. 1, when the unit 10 is horizontally disposed, the laterally inner ends of the tubular sections 60 are spaced an appreciable distance from the abutments 68. To raise the banker to its raised or inoperative position it is only necessary to actuate the lift mechanism 20 which will cause the cable 70 to exert an upwardly and laterally inwardly directed pull on the banker unit 10.

The action is such that before the inner ends of tubes or sleeves 60 engage the associated abutments 68, raising action exerted through the lifting cable 70 serves first to raise the outer end of the banker, but after the sleeves 60 engage the abutments 68 the raising of the banker occurs with relatively small angular displacement until the banker approaches its fully raised position. This is disclosed and claimed in the copending application, mentioned above.

Driving means are provided which interconnect the banker unit with the tractor. The driving means includes a universal joint 72 (FIG. 2) which has one of its members 74 connected to the drive shaft 76 of the power banker, the outer member of the universal joint 72 being connected to a short shaft 78, and the latter carrying a similar universal joint means 80. The means 72, 78, 80 form a double universal joint shaft means that serves to connect the output shaft 82 of the bevel gear unit 28 with the input or drive shaft 76 of the second bevel gear unit 82. The input shaft 84 (FIG. 1) of the bevel gear unit 28 is in turn connected with the tractor power take-off by means of which includes the tubular shaft 86, the universal joint 88, and the slip clutch 90. The banker supporting and lifting means and the drive means described above forms no part of the present invention and is more fully described in applicant's Patent 3,092,053.

The power banker attachment 10 includes a frame or housing 92 for the digging and slinging wheel 94 and the delivery wheel 96, and also includes an attaching member 98 (FIG. 4). The two laterally inwardly projecting front and rear hinge brackets 36, 38 are integrally secured to the inward wall 100 of the attaching member 98, the inward wall 100 being apertured to receive the drive shaft 76. Mounted between upper and lower flanges 104, 106 of the member 98 is a second bevel gear unit 82 which is in turn interconnected with the wheels 94, 96 to rotate the same. Mounted on the upper flange 104 is an anchor strap 110 which receives one end of the cable 70.

The housing 92 is secured to the forward wall of the member 98 and includes front and rear side walls 112, 114 and an integral wall having an inner portion 115 and a top portion 116 which terminates in a discharge opening 118. The digging and slinging wheel 94 consists essentially of a disklike member 120 which is carried in a conventional manner by the rotatable shaft 122 which extends forwardly from the second bevel gear unit 82. Digging and slinging blades 124 are of generally U-shaped construction and one leg of each is secured to the disk 120. Mounted outwardly of the digging and slinging wheel 94 is the delivery wheel 96, this wheel having a generally star-shaped configuration in which the leading sides or delivery faces 126 of the points are more acutely angled with respect to the radius than are the trailing sides 128, the angle of the faces 126 being such as to guide the flow of earth received from the wheel 94 upward and outward in a pattern that will build up the desired shape and height of the tree bank 129. The plates that form the leading and trailing sides are secured between front and rear disks 130, 132, and the wheel assembly is carried on an axle shaft 134 which is journaled in front and rear bearings 136, 138 on the front and rear side walls respectively. As best can be seen from a comparison of FIGS. 1 and 4 the side walls can be so dimensioned that disks 130, 132 project beyond the edges of the side walls (FIG. 4) or be confined within the edges (FIG. 1). The delivery wheel is driven through a V-belt 140 which has one end passing over the sheave 142 on the axle shaft 134, and the other end passing over the sheave 144 on the outwardly extending stub shaft 146 of the second bevel gear unit 82. (The stub shaft 146 may be in integral extension of shaft 76.) Intermediate portions of the V-belt are passed over idler sheaves 148 which are rotatably carried on a bracket 150, which in turn are adjustably carried on a fixture 152 secured to the rear wall 114 of the housing 92.

Inner and outer skids 154, 156 are available for controlling the depth of the digging wheel and, in turn, the size of the tree bank or irrigation ring. Each of the skids includes a ground engaging runner 158 which is provided with two upstanding lugs 160. The lugs are pivotally secured to depending supports 162 which are in turn provided with elongated apertures 164 which receive a fastener 166 which secures the supports to the front and rear walls 112, 114. By loosening the fasteners 166 the skids may be moved up and down to their proper operating height.

Alternatively, as illustrated in FIG. 2, a diagonally ribbed roller 168 may be employed to control the depth of the digging wheel, this construction being preferred in trashy conditions. The roller assembly includes two end members 170 which rotatably carries the roller 168, the end members being provided with inturned ends 172 having elongated apertures (not shown) that receive the fasteners 166. The height of the roller is adjusted in the same manner as the skids 154, 156. The end members 170 also carry a sharpened shearing blade or bar 174 across the front of the roller, the bar acting to remove any trash from the roller.

Side deflectors 176 and an upper deflector 178 (FIG. 5) are provided within the housing between the digging and slinging wheel and the delivery wheel. The deflectors serve to control the earth which is carried upward and thrown outward by the U-shaped digging blades 124 and to guide the earth to the correct point of contact with the outer delivery wheel 96. The final point of deposit can be controlled partially by changing the angle of the upper deflector 178, since by directing the flow lower on the outer delivery wheel there will be a more upward flow of dirt from the wheel 96 and, consequently, a closer final deposit. Directing the flow higher on the wheel 96 results in a flatter trajectory from the wheel and a farther throw to the point of deposit. As can be seen from FIG. 5, the upper deflector 178 is provided with upstanding ears 180 that are provided with elongated apertures 182. Fasteners 184 pass through the apertures 182 and corresponding apertures in the walls 112, 114 of the housing 92. Angle adjustment of the upper deflector is obtained by loosening the fasteners 184 and by sliding the deflectors in and out to the extent permitted by the slots 182, and at the same time, keeping the inner end tight against the banker housing top cover 116. This adjustment is important as it provides means to deposit at the intersection A (FIG. 2) of the center lines of the tractor rear axle and the banker flow, which enables the tractor operator to drive easily about a true center point.

Applicant has provided an irrigation ring baffle 186 which is employed when it is desired to form irrigation rings around trees to hold water. The baffle or hood 186 is illustrated in FIG. 1 and includes front and rear side walls 188 and an arcuate side and top wall 190. The hood 186 is secured to the side walls 112, 114 by fasteners 192. In operation the baffle will receive the earth from the delivery wheel and direct it downwardly whereby it is deposited relatively closely to the unit 10 to form a ring 193 as shown in FIG. 3.

Applicant has found that in operation of his power banker attachment that unequal loading results from the outward pull of the digging wheel which tends to lift the inner skid 154 (or the inner portion of the diagonally ribbed roller 168) clear of the ground. In order to equalize the loading on each of the banker depth control skids applicant has provided a tension spring 194 which is disposed between the lugs 196, 198 on the abutment 68 and the sleeve 200, respectively, the sleeve 200 being provided with means 202 to secure it to the tubular section 60 of the outer control rod member 56.

While I have shown and described above the preferred structure in which the principles of the present invention have been incorporated, it is to be understood that my invention is not to be limited to the particular details shown and described above, but that, in fact, widely different means may be employed in the practice of the broader aspect of my invention.

What I claim, therefore, and desire to secure by Letters Patent is:

1. An earth working apparatus of the class described comprising: a transverse housing having a top wall and front and rear side walls, means to propel said housing generally forwardly, a digging and slinging wheel rotatably mounted within said housing about a substantially horizontal axis, a delivery wheel rotatably mounted in said housing about an axis substantially parallel to said first mentioned axis, means extending through at least one of said side walls and operative to rotatably drive said digging and slinging wheel, whereby rotation of said digging wheel will cause earth to be dug and slung transversely onto said delivery wheel, and means to rotate said delivery wheel whereby rotation of said delivery wheel will cause the earth to be delivered to its point of deposition, said delivery wheel having generally planar longitudinally extending surfaces.

2. An apparatus for forming irrigation rings about trees comprising: a transverse housing having a top wall and front and rear side walls, a delivery wheel rotatably disposed about a substantially horizontal axis, said wheel being at least in part between said side walls and extending outwardly from the top portion of said housing, said delivery wheel having generally planar longitudinally extending surfaces, earth digging and conveying means mounted in said housing about an axis parallel to said first mentioned axis, said last mentioned means conveying earth to said delivery wheel, means to drive said digging and conveying means and said delivery wheel whereby earth will be discharged from said apparatus, and means removably mounted on said housing above the axis of the rotatable delivery wheel to deflect the discharged earth.

3. An earth working apparatus of the class described comprising: a transversely extending housing, earth digging and slinging means rotatable about a substantially horizontal axis and disposed in said housing, earth delivery means in said housing and rotatable about an axis substantially parallel to said first mentioned axis, and means drivingly interconnecting said aforementioned means, said delivery means comprising a generally star-shaped wheel, the apical portions of the star-shaped wheel having leading and trailing sides, the leading sides being more acutely angled with respect to the radius of the wheel than the trailing sides.

4. An earth working apparatus for forming embankrear and inner side walls, a digging and slinging wheel rotatably mounted at least in part within said housing adjacent the inner wall, a delivery wheel rotatably mounted at least in part within said housing, means to rotate said wheels in the same direction, the upper surfaces of said wheels rotating away from said inner wall, and deflector means mounted within said housing above and between the axes of said wheels to control the earth which is thrown rearwardly by said digging and slinging wheel and to guide the earth to the correct point of contact with the delivery wheel.

5. An earth working apparatus for forming embankments comprising: a housing having a top wall and front, rear, and inner side walls, a digging and slinging wheel rotatable about a substantially horizontal axis and mounted at least in part within said housing adjacent the inner wall, a delivery wheel rotatable about an axis substantially parallel to said last mentioned axis and mounted at least in part within said housing, said delivery wheel having generally planar longitudinally extending surfaces, means to rotate said wheels in the same direction, the upper surfaces of said wheels rotating away from said inner wall, and support means mounted on said housing and engageable with ground surface to support said housing a fixed distance from said ground surface, the lower surface of said digging and slinging wheel being normally disposed below the surface of the ground when said support means is in contact with ground surface.

6. An earth working apparatus for forming embankments comprising: a housing having a top wall and front, rear, and inner side walls, means secured to said housing to propel said housing forwardly, a digging and slinging wheel rotatable about a substantially horizontal axis and mounted at least in part within said housing adjacent the inner wall, a delivery wheel rotatable about an axis substantially parallel to said first mentioned axis and mounted at least in part within said housing, said delivery wheel having generally planar longitudinally extending surfaces and means to rotate said wheels in the same direction, the upper surfaces of said wheels rotating away from said inner wall.

7. An earth working apparatus comprising: a generally transversely extending housing having a top wall and front, rear, and inner side walls, a pair of transversely disposed earth working wheels mounted at least in part within said housing about generally parallel fore-and-aft extending axes, means operatively interconnecting and driving said wheels, the inner of said wheels contacting said ground and being adapted to dig and sling earth to the other of said wheels, said other wheel being adapted to receive the earth from the inner wheel and to deliver it at its point of deposition, said last mentioned wheel having generally planar longitudinally extending surfaces and means to propel said housing forwardly.

References Cited by the Examiner

UNITED STATES PATENTS

| 258,150 | 5/82 | Stock | 37—25 |
|---|---|---|---|
| 502,214 | 7/93 | Whitmore | 172—39 |
| 944,173 | 12/09 | Bullock | 275—2 |
| 1,122,481 | 12/14 | Cowart | 172—39 |
| 1,249,555 | 12/17 | Townsend | 172—39 |
| 1,820,707 | 8/31 | Moen et al. | 37—43 |
| 1,850,357 | 3/32 | Pitcher | 172—39 |
| 1,912,706 | 6/33 | Goodman | 172—112 X |
| 2,368,331 | 1/45 | Seaman | 172—39 X |
| 2,595,537 | 5/52 | Pitcher | 172—39 |
| 2,751,831 | 6/56 | Null | 172—39 |
| 2,835,182 | 5/58 | Smithburn | 172—556 |
| 2,974,469 | 3/61 | Smith et al. | 56—25.4 |
| 2,974,735 | 3/61 | Smith et al. | 172—108 |
| 2,986,841 | 6/61 | MacDonald | 172—39 |
| 3,012,371 | 12/61 | Pamela | 172—112 X |
| 3,054,461 | 9/62 | Maquire | 172—112 X |

FOREIGN PATENTS 674,769  7/52  Great Britain.

T. GRAHAM CRAVER, *Primary Examiner.*

CARL W. ROBINSON, *Examiner.*

UNITED STATES PATENT OFFICE
CERTIFICATE OF CORRECTION

Patent No. 3,194,320                                July 13, 1965

Kenneth L. Kirkpatrick

It is hereby certified that error appears in the above numbered patent requiring correction and that the said Letters Patent should read as corrected below.

Column 5, line 32, after "embank-" insert -- ments comprising: a housing having a top wall and front, --.

Signed and sealed this 17th day of May 1966.

(SEAL)
Attest:

ERNEST W. SWIDER                              EDWARD J. BRENNER
Attesting Officer                                      Commissioner of Patents